United States Patent [19]

Kauss et al.

[11] 4,235,470
[45] Nov. 25, 1980

[54] UTILITY VEHICLE WITH A SELF-CONTAINED DRIVER COMPARTMENT

[75] Inventors: Wolfgang Kauss, Berlin; Ludwig Muncke, Feldkirchen-Westerham, both of Fed. Rep. of Germany

[73] Assignee: Fritzmeier AG, Lenzburg, Switzerland

[21] Appl. No.: 921,609

[22] Filed: Jul. 3, 1978

[30] Foreign Application Priority Data

Jul. 4, 1977 [DE] Fed. Rep. of Germany ....... 2730139

[51] Int. Cl.³ .............................................. B60P 3/03
[52] U.S. Cl. .................................. 296/190; 180/89.12; 296/35.1
[58] Field of Search ............................. 296/190, 35 R; 180/89.12, 89.13, 89.14, 89.16, 89.19

[56] References Cited

U.S. PATENT DOCUMENTS

| 3,059,958 | 10/1962 | Lindblom | 296/35 R |
| 3,732,941 | 5/1973 | Davis | 180/89 R |
| 4,141,429 | 2/1979 | Hale | 296/35 R |
| 4,149,608 | 4/1979 | Hennessey | 296/35 R |

FOREIGN PATENT DOCUMENTS

| 1555946 | 8/1970 | Fed. Rep. of Germany | 296/190 |
| 2150424 | 5/1973 | Fed. Rep. of Germany | 296/190 |
| 2217182 | 10/1973 | Fed. Rep. of Germany | 296/190 |
| 2505686 | 8/1976 | Fed. Rep. of Germany | 296/190 |
| 872389 | 6/1942 | France | 296/190 |

OTHER PUBLICATIONS

"Automotive Industries", Nov. 1, 1964, p. 45.

*Primary Examiner*—John J. Love
*Assistant Examiner*—John A. Carroll
*Attorney, Agent, or Firm*—Oblon, Fisher, Spivak, McClelland & Maier

[57] ABSTRACT

A utility vehicle with a self-contained driver compartment and with spring and damping elements by which the driver compartment is elastically supported on the rest of the vehicle mass. Located centrally between the driver compartment and the rest of the vehicle there is provided a guide arrangement which guides the driver compartment in all its motions relative to the rest of the vehicle and which consists of a vertical guide as well as two rotating guides coupled with it, their pivot axes being in the vehicle's longitudinal direction and transverse to it.

24 Claims, 5 Drawing Figures

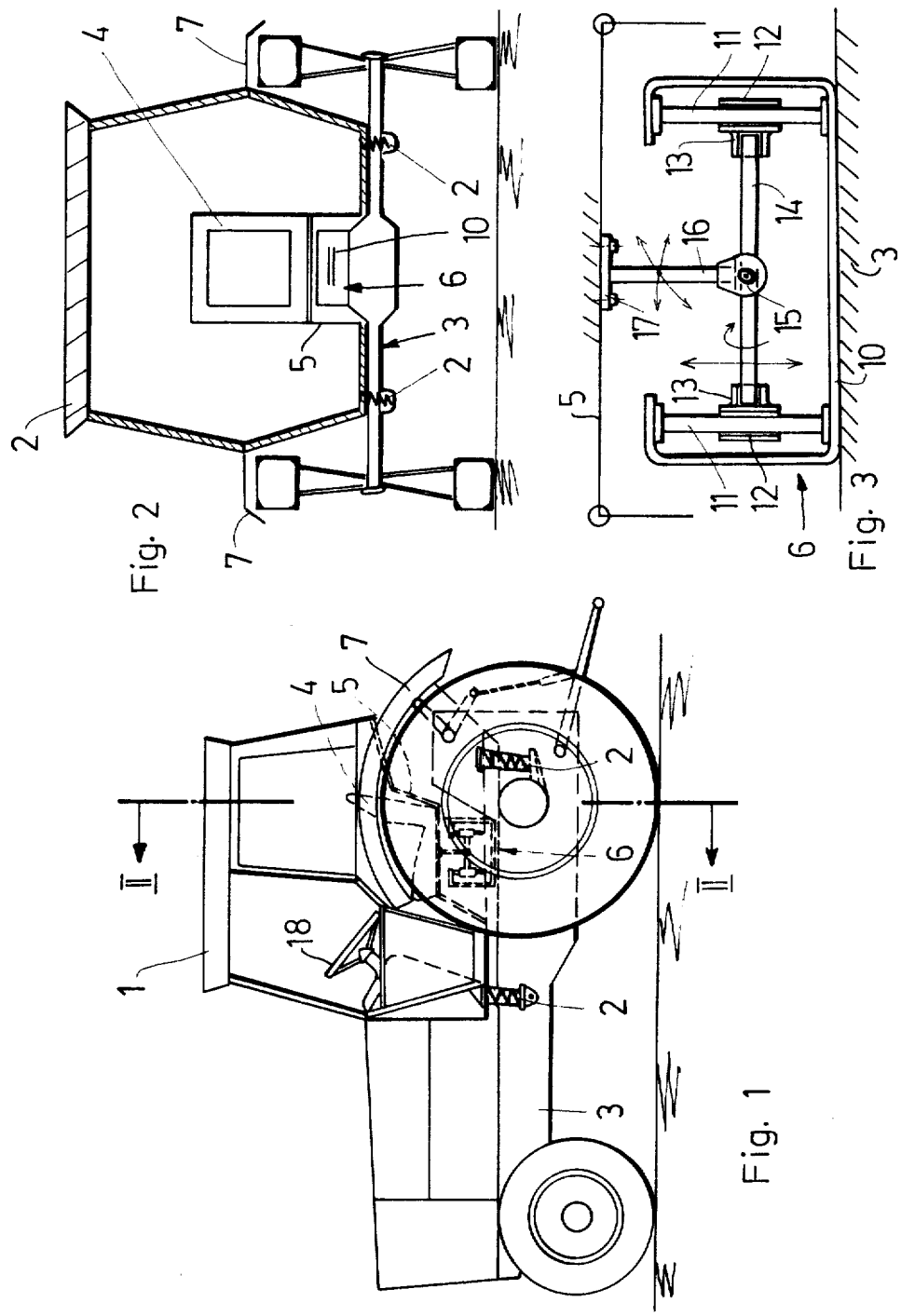

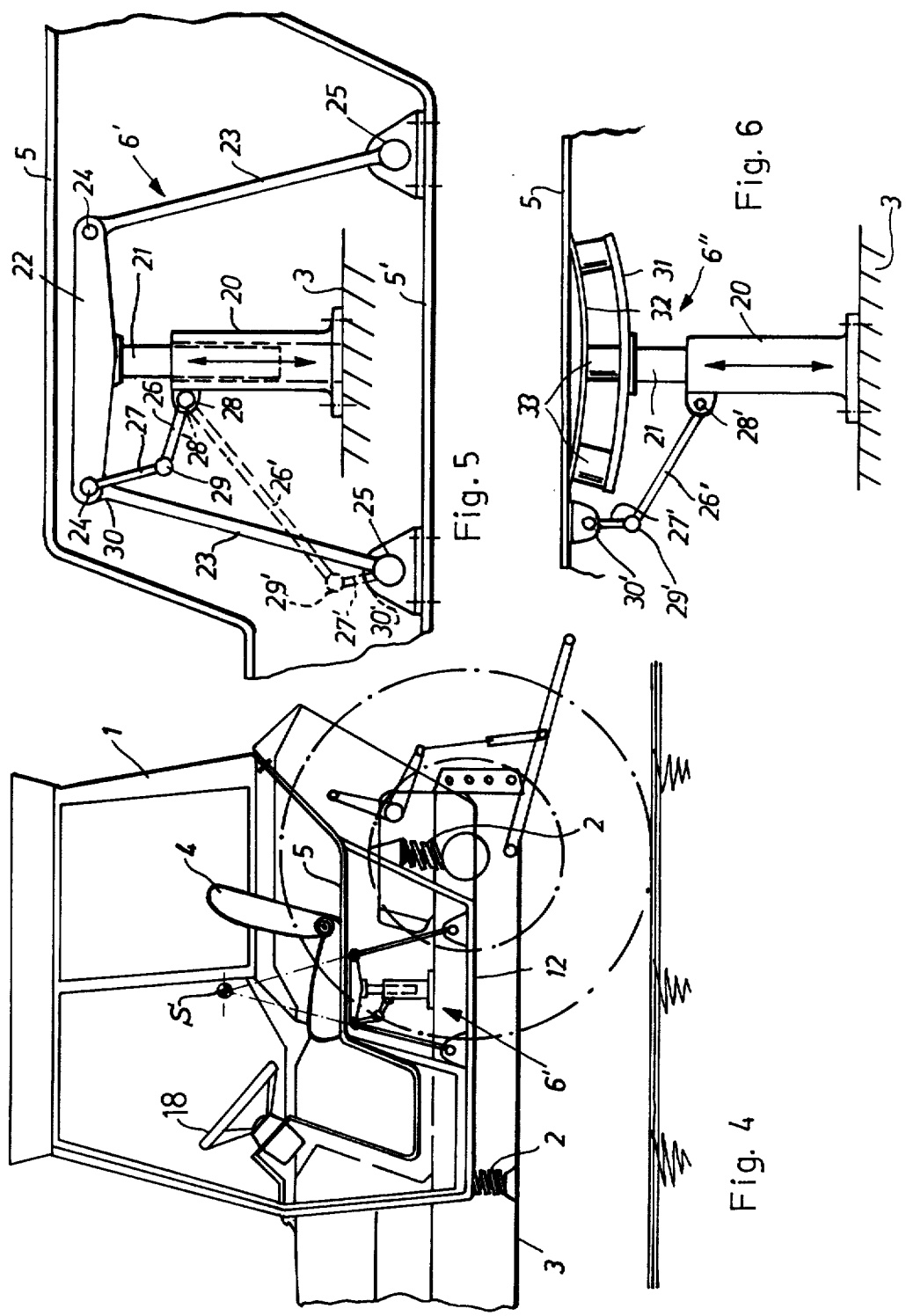

UTILITY VEHICLE WITH A SELF-CONTAINED DRIVER COMPARTMENT

BACKGROUND OF THE INVENTION

1. Field of the Invention:

The invention relates to a utility vehicle with a self-contained driver compartment and with spring and damping elements by which the driver compartment is elastically supported on the rest of the vehicle mass.

2. Description of the Prior Art:

In a utility vehicle of this type described in the journal "Automotive Industries", Nov. 1, 1964, p. 45, the driver compartment is supported on the rest of the vehicle at its four lower corners with leaf springs and dampers, with the main direction of action of the leaf springs being vertical. This known spring suspension of the driver compartment favors shaking and rocking motions of the driver compartment. These motions can achieve greater oscillation amplitudes than in a rigid attachment of the driver compartment to the rest of the vehicle. Such, at times violent, oscillations of the driver compartment interfere with the driver's performance.

The problem for the invention is to develop a vehicle of the type discussed so that the driver compartment exhibits a more suitable and controlled vibration and shock behavior.

SUMMARY OF THE INVENTION

This problem is solved by the invention by providing a guide arrangement centrally between the driver compartment and the vehicle to guide the driver compartment in all its motions relative to the vehicle, the guide arrangement consisting of a vertical guide as well as two rotational guides coupled to it, the pivot axes of which are parallel and transverse to the length of the vehicle.

Because of the invention's centrally-located guide arrangement the driver compartment can thus move only with three degrees of freedom, with a purely translational motion in the vertical direction possible while purely translational motions horizontally are eliminated. Motions of the driver compartment caused by horizontal shock components are thus converted by the guide arrangement into rocking motions which, as in vertical motion of the compartment, are cushioned and suppressed by the spring and damping elements. The oscillating behavior of the driver compartment is thus precisely definable, so that the spring and damping elements can be so arranged that they are stressed in their principal acting directions by all occurring compartment motions.

So that the mass inertia forces of the driver compartment can generate no moments affecting the motion behavior of the compartment, the invention provides for making the center of gravity of the driver compartment and the instantaneous center of rotation of the compartment motions enabled by the guide arrangement close together, in particular to coincide.

According to experience, the center of gravity of a self-contained driver compartment is about at a point over the driver's seat. It is advantageous then to raise the bottom of the driver compartment to place the central guide arrangement on the underside of the driver's seat, so that the guide arrangement approaches the center of gravity of the driver compartment as closely as possible.

According to a particular embodiment of the invention the guide arrangement exhibits at least one vertical linear guide along which a horizontal connection axis rotatable in a sliding bushing, is guided, on which a pivot bearing is so mounted that a connection part attached to the compartment can swing in a plane in which the connection axis lies. This form of the arrangement enables precise jam-free straight vertical guiding and two rotational guidings of the compartment with the simplest construction means, where it is guaranteed that the compartment along with its vertical translation motion can perform only pivot motions about a longitudinal and a transverse axis of the vehicle. The space requirement of this guide arrangement is slight, so that the space under the driver's seat suffices. Furthermore, the good vibration behavior of the driver compartment eliminates the need for the customary springing and damping of the driver's seat. Ordinary padding of the seat is enough.

Should it turn out that in the above embodiment of the guide arrangement the distance between the center of gravity of the driver compartment and the instantaneous center of rotation of the guide which is located in the region of the guide arrangement, is too great, the driver compartment may be appropriately furnished with extra masses, which shift the center of gravity of the driver compartment in the direction of the instantaneous center of rotation and downwards to the guide arrangement.

Additional masses in the driver compartment, however, must likewise be guided and sprung and they increase the gross weight of the vehicle. For these reasons the guide arrangement in an advantageous variant of the invention is so designed that it has a virtual instantaneous center of rotation at the center of gravity of the driver compartment. In this way it is guaranteed that mass inertia forces cannot adversely affect the motion of the compartment.

It is provided for, here, in particular that the guide arrangement has at least one vertical guide directed through or nearly through the center of gravity of the compartment in the form of a rod fastened to the compartment and sliding in a guide attached to the vehicle chassis.

This vertical guide absorbs the essentially vertical shocks ocurring in a vehicle.

In order also that the rotational guides may guarantee a virtual instantaneous center of rotation at the center of gravity, the guide arrangement has, in addition, links mounted with pivots between the vehicle chassis and driver compartment, where the lines through the pivot centers of each link pass through the center of gravity of the compartment. The intersection of these lines does indeed move with excurstion of the links from their normal position, but these excursions of the links are only about 2 to 5 degrees so that the departure of the virtual instantaneous center of rotation from the center of gravity of the driver compartment is of no practical significance.

The links themselves are so made and supplemented by further link connections between the driver compartment and the chassis, so that the compartment can rock only about mutually perpendicular axes along and transverse to the vehicle.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several view, and wherein:

FIG. 1 is a side view of a tractor with a first embodiment of a central guide arrangement;

FIG. 2 is a cross section of the tractor along the line 11—11 in FIG. 1;

FIG. 3 is the guide arrangement of FIG. 1 enlarged;

FIG. 4 is a longitudinal sectional view of a tractor with a second embodiment of the central guide arrangement;

FIG. 5 is an enlarged representation of the guide arrangement of FIG. 4; and

FIG. 6 is a modification of the second embodiment of the guide arrangement.

DETAILED DESCRIPTION OF THE PREFERRED EMBODIMENTS

The tractor shown in side view in FIG. 1 has a self-contained driver compartment 1, which is supported by spring and damping elements 2 on the tractor chassis 3. Under the driver's seat 4 inside the compartment the floor 5 of the latter is raised to the seat bottom to make room under the compartment for a guide arrangement 6. The driver's seat 4 has only the self-cushioning corresponding to a normal work seat, i.e. a padded seat surface. The two mudguards 7 for the rear wheels are integral with the compartment sides (FIG. 2).

The guide arrangement 6 is situated in a housing 10 fastened underneath to the tractor chassis 3. As is shown in FIG. 3, at the front and rear walls of the housing are two vertical straight guides 11 spaced from one another and anchored to the housing 10, and along each of which is guided a bushing 12 with a pivot 13 formed in it to receive, normal to the straight guides, an end of a rotatable connecting axis 14. At the center of the connecting axis 14, on a pivot 15, a connecting part 16 pointing vertically upwards is so mounted that it can tilt in a plane in which the connecting axis 14 lies. To the upper end of the connecting part 16 is welded a head plate 17 which is bolted to the compartment floor 5 near the middle under the driver's seat 4.

As the arrows in FIG. 3 show, the straight guide 11 permits vertical motion of the driver compartment 1, the pivot 13 of the connecting axis 14 always lying along the length of the vehicle permits rocking of the driver compartment 1 about an axis along the length of the vehicle and the pivot 14, rocking of the compartment 1 about a transverse axis parallel to the rear axle of the tractor.

From this is seen that the motion centerpoint or the instantaneous center of rotation of the motion directions lies in the region of the guide arrangement 6, so that in the design of the driver compartment, it must be remembered that the center of gravity must be as low as possible and must be as close as possible to the guide arrangement 6. If this is not possible to a sufficient degree, then extra masses are to be mounted in the driver compartment to displace the center of gravity downwards.

The driver compartment 1 is connected with the tractor chassis 3 at least three points by means of spring and damping elements 2. In this case it is advantageous because of the smaller forces to locate the spring and damping elements 2 far from the central guide arrangement, e.g. at the lower corners of the driver compartment 1, as shown in FIGS. 1 and 2. Constructively more expensive but simpler with respect to mounting the compartment and inspecting the spring and damping elements 2 and the guide arrangement 6 is to locate the spring and damping elements partially or completely in the central guide arrangement. This is not illustrated separately in the drawing.

Through the guide arrangement it is ensured that, not only the translational motion of the driver compartment 1 in the vertical direction acts on the essentially vertically arranged spring and damping elements 2, but also that the driver compartment 1, even in its rocking motions about a longitudinal and a transverse axis, acts essentially vertically on the spring and damping elements 2, which is true when the rocking axes do not lie too far from the plane of the spring and damping elements 2. In consequence, only straightforward spring and damping elements 2 are required, the main direction of action of which is translational.

The controls to be manipulated by the driver, as for instance the steering wheel 18, are made integral with the driver compartment 1. Their connections to the tractor chassis 3 must therefore be made in such a way that they readily follow the motions of the compartment 1 relative to vehicle chassis 3. For this reason the controls are connected to the tractor chassis via hydraulic hoses, Bowden linkages, articulated shafts or flexible shafts, not individually represented in the drawing.

Further, sound-damping elements, likewise not shown in the drawing, can be installed at the point of connection between the tractor chassis and the driver compartment.

In FIGS. 4 and 5 a second form of embodiment of the guide arrangement 6' is shown which likewise is located inside a central space formed by raising the compartment floor 5 up to the underside of the driver's seat 4. Centrally and perpendicularly beneath the center of gravity 5 of the driver compartment 1 indicated in FIG. 4 there is a vertical guide consisting of a guide tube 20 fastened to the tractor chassis 3 and a rod 21 sliding in it. To the upper end of the rod 21 is fastened a horizontal head plate 22 on which links 23 are articulated. These links 23 run slantingly downwards and are hinged to the portion of the compartment floor 5' sideways under the seat 4 that is not raised. In all at least three links 23 are provided between the head plate 22 and the compartment floor 5'. The pivots 24, with which the links 23 are articulated on the head plate 22, and the pivots 25, with which the links 23 are hinged to the compartment floor 5', are so oriented with respect to one another that imagined lines through the centers of these pivots intersect at the center of gravity 5 of the driver compartment 1, as is indicated with the broken lines in FIG. 4. The pivots 24 and 25 are biaxial cross-pivots, the fixed axes of which are aligned parallel to the length of the tractor and the swiveling axes of which are parallel to the rear axle of the tractor with the driver compartment 1 in its normal position. If the guide tube 20 and the rod 21 are so profiled that mutual rotation of these elements is possible the link arms 26 and 27 shown in FIGS. 4 and 5 are provided between the guide tube 20 and the head plate 22, which are articulated by means of pivots 28, 29 and 30, the axes of which are parallel to one another. Since in this way the head plate 22 is prevented from rotating about the vertical axis of the tractor and such rotation about the vertical axis is likewise excluded by the biaxial cross-pivots 24 and 25, the driver compartment 1, along with vertical motion, can perform only a rocking motion about a longitudinal axis parallel to the length of the tractor and about a transverse axis parallel to the tractor's rear axle. Since, moreover, only slight excursions of 2 to 5 degrees are possible through the spring and damping elements 2, the instantaneous center of rotation of the possible motions lies practically at the center of gravity 5 of the driver compartment 1. Through the use of biaxial cross-pivots for the articulations 24 and 25 and a vertical guide between elements 20, 21 which prevents rotation of the head plate 22, the link arm 26 and 27 naturally become superfluous.

If the pivots 24 and 25 are in the form of ball joints rather than biaxial cross-pivots, the driver compartment 1 can then rotate about the vertical axis of the tractor chassis 3 even if the head plate 22 is fixed against rotation. In this case link arms must be provided between the chassis and driver compartment to exclude such rotation about the vertical axis. This is the function performed by the link arms 26' and 27' shown dashed in FIG. 5, where additionally the pivot 30' must be in the form of a ball joint to permit the desired rocking motion of the driver compartment 1.

FIG. 6 shows a modification of the second form of embodiment of the guide arrangement 6", in which the links are replaced by a spherical bearing made up of two calotte shells 31 and 32. The essentially horizontally disposed calotte shells, the radius of curvature of which equals their distance from the center of gravity 5, are directly below the driver's seat 4 underneath the raised compartment floor 5 and vertically beneath the center of gravity 5. The lower bearing shell is attached to the upper end of the rod 21 of the vertical guide 20, 21, while the upper bearing shell is attached to the compartment floor 5. Between the calotte shells 31 and 32 are arranged elastic masses 33 so that relative mobility between the two calotte shells and thus between the driver compartment 1 and the chassis 3 is permitted. In this embodiment, too, rotation of the driver compartment 1 about the vertical axis of the tractor chassis 3 is prevented by link arms 26' and 27', with the pivot 30' on the floor 5 being in the form of a ball joint.

The elastic bodies 33 between the calotte shells 31 and 32 can be, for example, of rubber or PUR. They can also be replaced by a sliding means, in which case measures must be taken to keep the calotte shells 31 and 32 from separating.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Utility vehicle with a self-contained driver compartment and with spring and damping elements by which the driver compartment is elastically supported on the rest of the vehicle mass, characterized by the fact that there is provided centrally between the driver compartment (1) and the vehicle mass (3) a guide arrangement (6; 6'; 6") which guides the driver compartment (1) in all motions relative to the vehicles mass (3) and which consists of a vertical guide (11, 12; 20, 21) as well as two rotational guides coupled with said vertical guide, the axes of said rotational guides run parallel and transverse to the length of the vehicle.

2. Utility vehicle as in claim 1, characterized by the fact that the center of gravity (5) of the driver compartment and the instantaneous center of rotation of the guide arrangement (6; 6'; 6") enable compartment motions to lie close together, in particular to coincide.

3. Utility vehicle as in claim 1 or 2, characterized by the fact that the floor (5) of the driver compartment (1) is raised in the vicinity of the driver's seat (4) up to the under side of the latter to receive the central guide arrangement (6; 6'; 6").

4. Utility vehicle as in claim 1, characterized by the fact that the guide arrangement (6) exhibits at least one vertical straight guide (11) along which a slidable bushing (12) with a horizontal connecting axis (14) pivoting in it is guided, on which connecting axis is mounted a pivot (15) in such a manner that a connecting part (16) fastened to the compartment can swing in a plane in which the connecting axis (14) lies.

5. Utility vehicle as in claim 4, characterized by the fact that the driver compartment (1) is furnished with extra masses which shift the center of gravity (5) of the driver compartment in the direction of the instantaneous center of rotation and downwards to the guide arrangement (6).

6. Utility vehicle as in claim 1, characterized by the fact that the driver compartment (1) is connected to the vehicle mass (3) at at least three points by spring and damping elements (2).

7. Utility vehicle as in claim 1, characterized by the fact that the spring and damping elements (2) are located at a distance from the central guide arrangement (6; 6'; 6").

8. Utility vehicle as in claim 1, characterized by the fact that the spring and damping elements are located partially or totally in the central guide arrangement.

9. Utility vehicle as in claim 1, characterized by the fact that the mudguards (7) of the rear wheels are integrated with the driver compartment (1).

10. Utility vehicle as in claim 1, characterized by the fact that the control elements (18) are integrated with the driver compartment and thus can move relative to the vehicle mass (3) with the three degrees of freedom of the vehicle compartment.

11. Utility vehicle as in claim 10, characterized by the fact that the control elements (18) are connected with the vehicle chassis (3) via hydraulic hoses.

12. Utility vehicle as in claim 1, characterized by the fact that sound damping elements are installed at the points of connection between the vehicle chassis (3) and driver compartment (1).

13. Utility vehicle as in claim 1, characterized by the fact that the guide arrangement (6'; 6") has a virtual instantaneous center of rotation at the center of gravity (5) of the driver compartment (1).

14. Utility vehicle as in claim 13, characterized by the fact that the guide arrangement exhibits at least one vertical guide (20, 21) having a guiding direction parallel to the center of gravity (5) of the driver compartment and consisting of a guide tube (20) fastened to the vehicle chassis (3) and a rod (21) guided therein, which is connected to the driver compartment in an articulated manner.

15. Utility vehicle as in claim 14, characterized by the fact that the guide arrangement (6') exhibits links (23) which are articulated with pivots (24, 25) between the rod (21) and the driver compartment (1), where the lines through the pivot centers of each link pass through the center of gravity (5) of the driver compartment (1).

16. Utility vehicle as in claim 15, characterized by the fact that the rod (21) of the vertical guide exhibits a head plate (22) to which the links (23) are attached with upper pivots, the links (23) being attached to the floor (5') of the driver compartment (1) with lower pivots (25).

17. Utility vehicle as in claim 15 or 16, characterized by the fact that the pivots (24, 25) are in the form of biaxial cross-pivots for guiding the rocking motions of the compartment about axes parallel and transverse to the vehicle's length.

18. Utility vehicle as in claim 15 or 16, characterized by the fact that the pivots (24, 25) are ball joints, where, for prevention of motion of the driver compartment (1) about the vertical axis of the vehicle a further link connection (26', 27') is provided between the driver compartment (1) and the vehicle chassis (3).

19. Utility vehicle as in one of the claims 13 or 14, characterized by the fact that the guide arrangement (6") exhibits a spherical bearing of two calotte shells (31, 32), a center point of the motion of which lies at the center of gravity (5) of the driver compartment (1), one calotte shell (31) of which is attached to the upper end of the rod (21) and the other (32) to the driver compartment (1), where to prevent rotation of the driver compartment (1) about the vertical axis of the vehicle a further link connection (26', 27') is provided between the vehicle chassis (3) and driver compartment (1).

20. Utility vehicle as in claim 19, characterized by the fact that sliding means are arranged between the calotte shells (31, 32), with the calotte shells being ensured against separating.

21. Utility vehicle as in claim 19, characterized by the fact that elastic bodies (33) are arranged between the calotte shells (31, 32) and fastened to them.

22. Utility vehicle as in claim 10, characterized by the fact that the control elements (18) are connected with the vehicle chassis (3) via Bowden linkages.

23. Utility vehicle as in claim 10, characterized by the fact that the control elements (18) are connected with the vehicles chassis (3) via articulated shafts.

24. Utility vehicle as in claim 10, characterized by the fact that the control elements (18) are connected with the vehicle chassis (3) via flexible shafts.

* * * * *